UNITED STATES PATENT OFFICE.

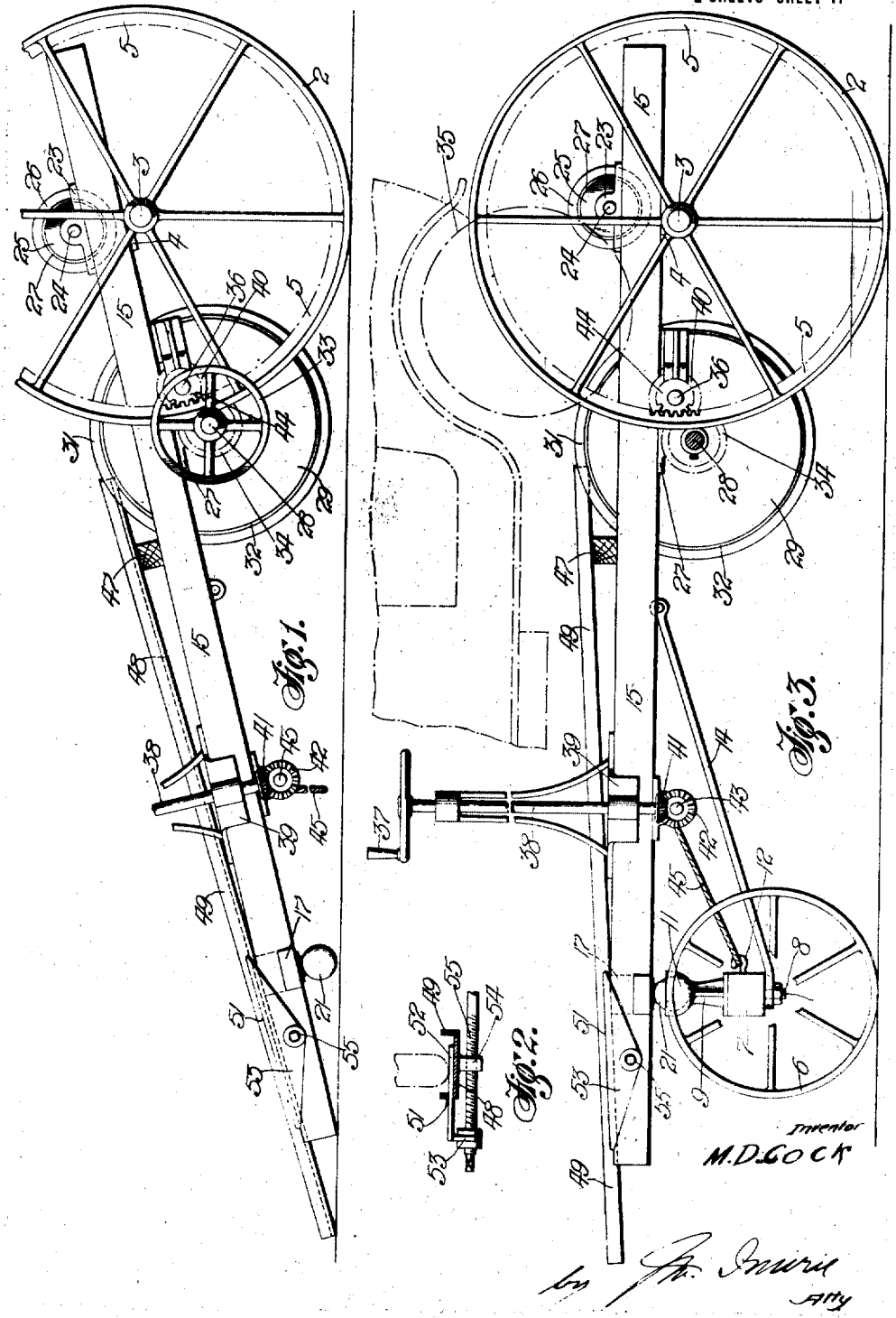

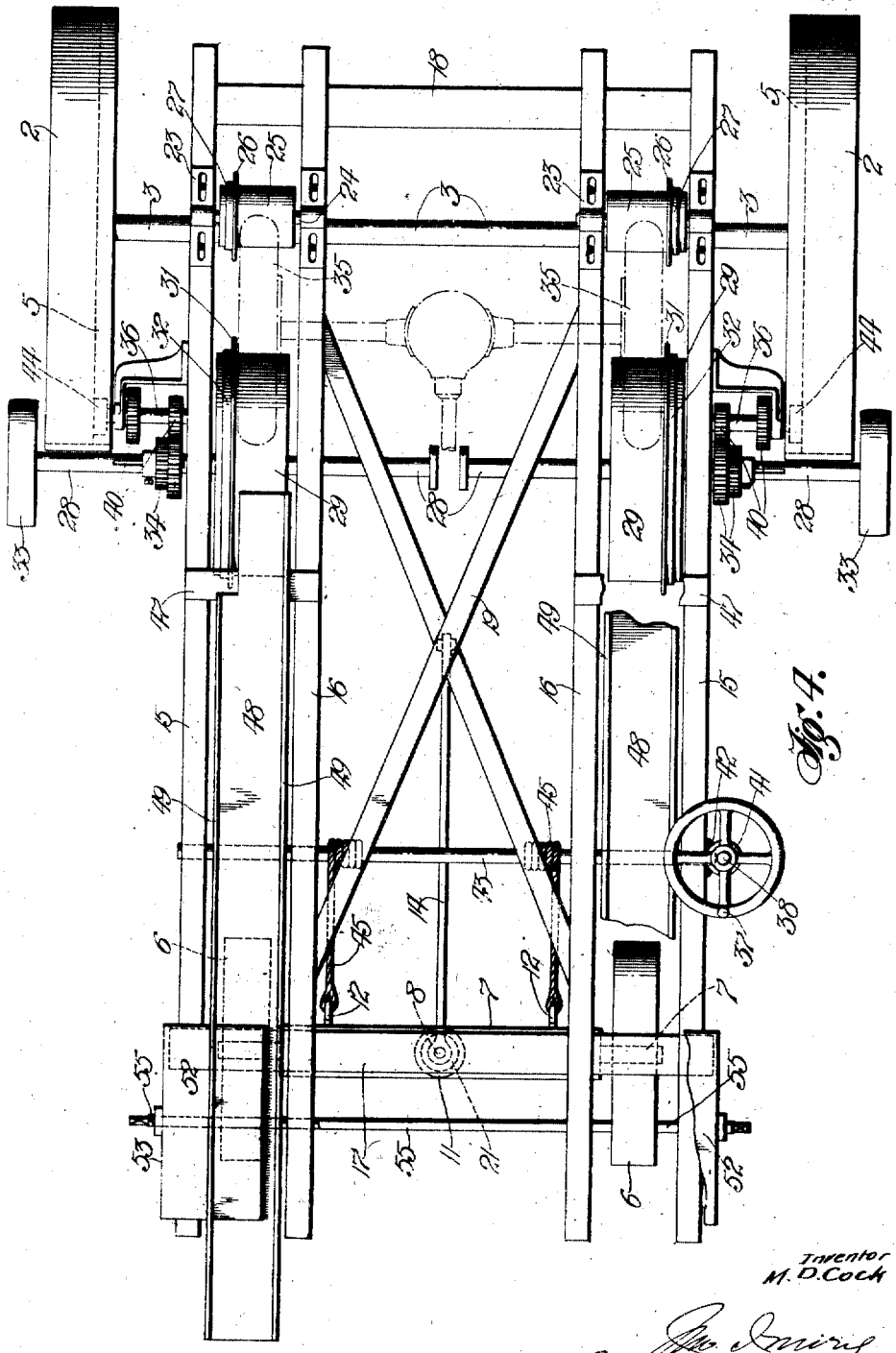

MICHAEL D. COCK, OF POWLETT RIVER, VICTORIA, AUSTRALIA.

AGRICULTURAL TRACTOR.

1,227,389.

Specification of Letters Patent.

Patented May 22, 1917.

Application filed May 11, 1916. Serial No. 96,919.

*To all whom it may concern:*

Be it known that I, MICHAEL DONALD COCK, a subject of the King of Great Britain and Ireland, residing in the town of Powlett River, in the shire of Phillip Island and Woolamai, county of Mornington, State of Victoria, Commonwealth of Australia, have invented certain new and useful Improvements in Agricultural Tractors, of which the following is a specification.

This invention relates to an under-carriage and its appurtenances, above which a motor car is backed the tired wheels of which rotate the rear or propelling wheels of the said under-carriage.

In the past the ordinary motor car was unfit for use as an agricultural tractor its wheels lacking the width and adhesion needful on plowed or soft ground. Such vehicles though useful to a farmer for pleasure or marketing purposes were not well adapted for field traction or farm work.

The object of this invention is to provide a suitable under-carriage and its accessories above which a motor car can be safely placed or equally as safely removed. No alteration whatever is needed to the car, no part of which is called upon to perform any other duty than that for which it was designed. When on the top of the undercarriage the motor can be used to propel the tractor or it may be employed for the driving of any machinery about a farm. Provision may be made for driving a fan whereby the radiating water is cooled when the motor car is performing farm work or traveling slowly.

Referring to the drawings which form a part of this specification:—

Figure 1 is a side elevation of an undercarriage the fore wheels of which have been removed and the front of which rests on the ground ready to receive the car. Portions are broken away for convenience of illustration.

Fig. 2 is a part sectional front view showing a lateral slide and a wheelway.

Fig. 3 is a side elevation showing the front of the under-carriage frame elevated and in broken lines the rear wheels of a car in position for work.

Fig. 4 is a plan of Fig. 3, the rear wheels and axle of the car being shown in broken lines.

On reference to the drawings it will be seen that the invention includes rear tractor wheels 2 united by a rear axle 3 turning in bearings 4. To each wheel is attached an internally toothed ring 5.

The front wheels 6 are united to a front axle 7 beneath the center of which is a king bolt pin 8. Above the said front axle is an upward extension 9 at the top of which is a cup 11. To the said axle are attached steering hooks 12.

To the said king bolt pin is attached the lower end of a king bolt stay 14, the upper end of which is pivoted to an under-carriage hereinafter referred to.

The said under-carriage includes two outer longitudinal members 15 and two inner longitudinal members 16. These may be united by a front cross piece 17 and a back cross piece 18. They are also stayed to each other by diagonal braces 19. To the back cross piece or an extension therefrom may be attached any form of draw hook or hooks or bar or bars. Protruding from beneath the front cross piece 17 is a ball 21 which fits into the cup 11.

Upon the rear part of the longitudinal members are attached bearings 23. These are capable of movement backward or forward. In each bearing turns an axle 24 supporting an idle roller 25. Each idle roller has thereon a flange 26, which may be adjustable laterally. It is secured to the said roller by a web 27 or other device.

Also situated upon the longitudinal members are bearings 27 supporting shafts 28 upon which are two tire driven wheels 29 provided with suitable internal friction clutches. Around each tire driven wheel is a flange 31. This may be secured to the said wheel by a web 32 or in any other way. The said flange is adjustable along the wheel to suit different widths of motor cars. Slidably mounted on the shafts 28 are toothed wheels 34. Also secured to the said shaft are one or more driving pulleys 33. Mounted on a counter shaft 36 at each side of the under-carriage and adapted to engage the toothed wheels 34 are toothed wheels 40. The toothed wheels 34 and 40 provide a change speed gear for the under-carriage. Mounted on the counter shaft 36 and engaging the internally toothed rings 5 are driving pinions 44.

Resting upon the idle rollers and the tire driven wheels are the rear wheels 35 of a motor car. Upstanding above the undercarriage is a steering handle 37. This may be so situated that the driver can sit in the motor car and control the engine and steer the tractor. It is secured to the top of a vertical steering shaft 38 turning in a bracket 39. At the bottom of the said vertical steering shaft is a first bevel wheel 41 turning a second bevel wheel 42 upon a horizontal steering shaft 43 turning in bearings attached to the under-carriage:

To the front hooks 12 upon the front axle are attached the front ends of steering ropes or chains 45. The rear ends are attached to the horizontal shaft 43.

Attached above the longitudinal members of the under-carriage in any well known way and having their upper ends preferably attached to a bearer 47 are wheelways. Each wheelway has a bottom 48 and sides 49. Through one of the sides in each wheelway is formed a slideway 51. This permits the passage of a slide 52, which slide is preferably of sheet metal. It has an outer depending portion 53 through which is an adjusting screw hole. Attached underneath the bottom is a stationary nut 54. In this nut turns an adjusting screw 55 which passes through an adjusting screw hole in the outer depending portion 53. This screw is turned by a spanner, a hand wheel or in any other way.

Suitable attachments can be provided whereby from one of the pulleys upon the counter shaft a belt drives a fan which fan causes a current of air upon the radiator of the motor car.

This invention is operated as follows:— When a motor is to be placed on the top of the under-carriage the front portion of the under-carriage by a screw jack or other arrangement is lifted so that the ball 21 is lifted from the cup. The king bolt pin stay is detached from the axle or from the under-carriage and the steering ropes or chains are unhooked from the axle. The said front axle is then pulled outwardly and the front portion of the under-carriage lowered to the ground. The rear of the motor car is then backed toward the lower ends of the wheelways and the car moved upwardly until its driving wheels 35 glide down the tire driven wheels 29 and rest between them and the idle rollers 25. The adjusting slides 52 upon the wheelways are so positioned that when the rear wheels of the motor car are in the position mentioned the front wheels rest upon the slides. These slides by the adjusting screw 55 can be moved to the right or to the left and any obliquity between the axle of the motor car and the shaft 28 can be removed. When the car is in position above the under-carriage it is secured thereto by straps or the like. The front portion of the said under-carriage is then elevated and the front axle repositioned. When the engine of the motor car is started it drives the tire driven wheels 29 which, when their clutches are thrown in, drive the toothed wheels 34 and 40 which communicate motion to the toothed rings 5. These turn the wheels 2 which propel the tractor. Should, however, it be desired to use the motor car as the driver of any stationary farm implement the toothed wheels 34 are disengaged from the toothed wheels 40 and belts can be applied to either or both of the driving pulleys 33 in which case the ends of the shafts are first connected by pins or the like.

I claim—

1. In agricultural tractors, the combination with a motor car, of an under-carriage adapted to support said car, a movable front axle, a cup carried by the said front axle, a ball carried by the under-carriage and accommodated by the cup, steering means connected to the axle, a stay connecting the front axle with the under-carriage, shafts mounted on the under carriage, tire driven wheels mounted on said shafts, counter shafts driven by said first mentioned shafts, rear wheels driven by said counter shafts, wheelways leading from the front of the under-carriage to the tire driven wheels, and idle wheels adjustable in relation to the tire driven wheels.

2. In agricultural tractors, the combination with a motor car, of an under-carriage adapted to support said car, a movable front axle to said under-carriage, a stay connecting the front axle with the under-carriage, a steering shaft adjacent the front axle, hooks carried by the front axle, steering ropes or chains connecting the hooks with the steering shaft, a steering handle operating said steering shaft, shafts mounted on the under-carriage, tire driven wheels mounted on said shafts, counter shafts adjacent the first mentioned shafts, change speed gearing carried by the first mentioned shafts and the counter shafts, driving pinions carried by the counter shafts, rear wheels mounted on the under-carriage, internally toothed rings carried by the rear wheels, said rings engaging the driving pinions, wheelways leading from the front of the under-carriage to the tire driven wheels, slide plates in said wheelways, idle wheels movable to and from the tire driven wheels and adjustable flanges carried by the tire driven wheels and the idle wheels.

3. In agricultural tractors, the combination with a motor car, of an under-carriage supporting said car, tire driven wheels carried by the under-carriage, wheel-ways leading from the front of the under-carriage to the tire driven wheels, idle wheels movable to and from the tire driven wheels, a flange mounted on the periphery of each tire driven wheel, means for laterally adjusting each of said flanges, a flange mounted on the periphery of each idle wheel, and means for laterally adjusting each of said flanges on the idle wheels.

4. In an under-carriage for the purpose described, the combination of a frame, front and rear wheels supporting said frame, gears mounted on the rear wheels, alined horizontal shafts mounted on the frame, a flanged friction wheel mounted on each shaft, a counter shaft mounted in advance of each rear wheel, a gear on each counter shaft meshing with the gears on the rear wheels, gearing between the respective horizontal shafts and the respective counter shafts, flanged idle wheels in rear of and in alinement with the friction wheels, guide-ways extending forwardly from the friction wheels, and means for steering the front wheels.

5. In an under-carriage for the purpose described, the combination of a frame, front and rear wheels supporting the frame, a pair of longitudinal guides on the frame, a pair of horizontal alined shafts mounted on the frame, a flanged wheel on each shaft, gearing between the horizontal shafts and the rear wheels, an idle flanged wheel on the frame in longitudinal alinement with the first mentioned flanged wheels, means for longitudinally adjusting the idle wheels, a slide extending across each guide-way near the front end thereof, means for adjusting each slide and holding same in adjusted position.

6. In an under-carriage for the purpose described, the combination of a frame, front and rear wheels therefor, a pair of longitudinal guide-ways on the frame, a pair of flanged wheels at the rear of and in alinement with the guide-ways, each flanged wheel being mounted independent of the other, gearing between the respective flanged wheels and the respective rear wheels, and flanged wheels mounted on the frame independently of each other in longitudinal alinement with the first mentioned flanged wheels.

In testimony whereof I affix my signature.

M. D. COCK.